United States Patent
Makki et al.

(10) Patent No.: US 12,309,682 B2
(45) Date of Patent: May 20, 2025

(54) MULTIROUTE INTEGRATED ACCESS AND BACKHAUL NETWORKS

(71) Applicant: Telefonaktiebolaget LM Ericsson (publ), Stockholm (SE)

(72) Inventors: Behrooz Makki, Pixbo (SE); Mikael Coldrey, Borås (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 358 days.

(21) Appl. No.: 17/797,583

(22) PCT Filed: Feb. 28, 2020

(86) PCT No.: PCT/SE2020/050222
§ 371 (c)(1),
(2) Date: Aug. 4, 2022

(87) PCT Pub. No.: WO2021/173051
PCT Pub. Date: Sep. 2, 2021

(65) Prior Publication Data
US 2023/0156560 A1     May 18, 2023

(51) Int. Cl.
*H04W 24/08*     (2009.01)
*H04W 40/12*     (2009.01)
*H04W 40/22*     (2009.01)

(52) U.S. Cl.
CPC .......... *H04W 40/12* (2013.01); *H04W 40/22* (2013.01)

(58) Field of Classification Search
CPC ..... H04W 40/12; H04W 40/22; H04W 40/16; H04W 40/14; H04W 24/08; H04W 24/18
See application file for complete search history.

(56) References Cited

U.S. PATENT DOCUMENTS 9,203,589 B1 * 12/2015 Perets .................. H04L 5/0048
9,351,228 B2    5/2016 Hui et al.
(Continued)

FOREIGN PATENT DOCUMENTS

EP     2541849 A1 *  1/2013  .......... H04L 45/121
EP     3138248 A1 *  3/2017  ......... H04L 43/0852
(Continued)

OTHER PUBLICATIONS

European Search Report dated Oct. 4, 2023 for Application No. 20921336.2, consisting of 11 pages.
(Continued)

*Primary Examiner* — Lan-Huong Truong
(74) *Attorney, Agent, or Firm* — Weisberg I.P. Law, P.A.

(57) ABSTRACT

Methods and nodes in an integrated access and backhaul (IAB) network. A method in a node in an IAB network for selecting a preferred route from a plurality of candidate routes for sending data from a first node to a second node in the IAB network is provided. Each candidate route includes at least one intermediate node between the first node and the second node. The method includes, for each candidate route, determining a predicted transmission delay associated with sending the data along the respective candidate route based on channel measurements between nodes along the respective candidate route and an error probability constraint, wherein the transmission delay is predicted for a transmission of the data that satisfies the error probability constraint in view of the channel measurements. The method further selecting a route from the plurality of candidate routes for sending the data based on the predicted transmission delays.

18 Claims, 4 Drawing Sheets

(56) References Cited

U.S. PATENT DOCUMENTS

| | | | |
|---|---|---|---|
| 9,525,617 B2 | 12/2016 | Vasseur et al. | |
| 2008/0013459 A1 | 1/2008 | Do et al. | |
| 2022/0030514 A1* | 1/2022 | Wu | H04W 36/0011 |

FOREIGN PATENT DOCUMENTS

| | | | | |
|---|---|---|---|---|
| WO | 2007043921 | A1 | 4/2007 | |
| WO | 2007140698 | A1 | 12/2007 | |
| WO | 2020167186 | A1 | 8/2020 | |
| WO | 2020182274 | A1 | 9/2020 | |
| WO | WO-2021140055 | A1 * | 7/2021 | H04W 40/02 |

OTHER PUBLICATIONS

Xue et al. "As hoc Qos on-demand routing (AQOR) in mobile ad hoc networks" Academic Press; Journal of Parallel and Distributed Computing; pp. 154-165; 2003, consisting of 12 pages.

Makki et al. "Fast HARQ Over Finite Blocklength Codes: A Technique for Low-Latency Reliable Communication" IEEE Transactions on Wireless Communications, vol. 18, No. 1, Jan. 2019; consisting of 16 pages.

International Search Report and Written Opinion dated Dec. 22, 2020 for International Application No. PCT/SE2020/050222 filed Feb. 28, 2020; consisting of 15 pages.

3GPP TR 38.874 1.0.0; 3rd Generation Partnership Project; Technical Specification Group Radio Access Network; Study on Integrated Access and Backhaul (Release 15); Dec. 2018; consisting of 112 pages.

Makki, Behrooz, et al.; Finite Block-length Analysis of the Incremental Redundancy HARQ; IEEE Wireless Communications Letters, vol. 3(5), Chalmers Publication Library; 2014; consisting of 5 pages.

3GPP TSG-RAN WG2 Meeting #107 R2-1910374; Title: Discussion on local decision making for routing; Agenda item: 11.1.3 (Adapt function); Source: Samsung; Document for: Discussion & Decision; Date and Location: Aug. 26-30, 2019, Prague, Czech Republic; consisting of 3 pages.

Bgpp Tsg-Ran WG2 Meeting #106 R2-1906964; Title: Discussion on the local route/path selection; Agenda Item: 11.1.3 (Adapt function); Source: Samsung; Document for: Discussion & Decision; Date and Location: May 13-17, 2019, Reno, NV, USA; consisting of 4 pages.

* cited by examiner

MULTIROUTE INTEGRATED ACCESS AND BACKHAUL NETWORKS

CROSS-REFERENCE TO RELATED APPLICATIONS

This application is a Submission Under 35 U.S.C. § 371 for U.S. National Stage Patent Application of International Application Number: PCT/SE2020/050222, filed Feb. 28, 2020 entitled "MULTIROUTE INTEGRATED ACCESS AND BACKHAUL NETWORKS," the entirety of which is incorporated herein by reference.

TECHNICAL FIELD

Embodiments of the present disclosure relate to methods and nodes for selecting a preferred route from a plurality of candidate routes for sending data from a first node to a second node in an integrated access and backhaul network.

BACKGROUND

One mechanism for satisfying the increasing demand for bandwidth in wireless communication networks is densification via the deployment of additional base stations. However, base stations are often connected to a core network using fibre connections, and deploying fibre connections to a large number of small cells may be expensive and impractical. Instead, wireless links may be used as a cheaper and more practical alternative for connecting these small cells to the core network. One such solution is an integrated access and backhaul (IAB) network, in which radio resources are used for the backhaul link connecting the base stations to the core network (see, for example, Study on Integrated Access and Backhaul, 3GPP TR 38.874 V1.0.0).

In an IAB network, a large number of access points (e.g. radio access network nodes or base stations) are deployed to densify the network. Each access point serves a number of wireless devices, which may be, for example, consumer premises equipments (CPEs) that connect a number of other devices to the network. IAB networks may provide improved channel quality on short-range links, as they are less affected by pathloss and shadowing, and have an increased probability of line-of-sight connections. By connecting access points to a core network via wireless, rather than fibre, links, IAB networks may also have reduced installation costs (e.g. by removing the need for trenching) whilst providing similar data rates to fibre connections.

SUMMARY

As described above, there are various advantages associated with IAB networks.

However, wireless links, such as those used for backhaul links in IAB networks, may be vulnerable to blockage (e.g. due to moving objects such as vehicles), which can lead to variations in channel quality. In addition, traffic variations can create uneven load distributions and increased scheduling delays, which may increase buffering costs and end-to-end delays. In addition, IAB networks may comprise any number of nodes, which means that there may be multiple routes for sending data through the IAB network. Aspects of the present disclosure address these and other problems.

In one aspect, the present disclosure provides a method in a node of an integrated access and backhaul (IAB) network, for selecting a preferred route from a plurality of candidate routes for sending data from a first node to a second node in the IAB network. Each candidate route comprises at least one intermediate node between the first node and the second node. The method comprises for each candidate route, determining a predicted transmission delay associated with sending the data along the respective candidate route based on channel measurements between nodes along the respective candidate route and an error probability constraint. The transmission delay is predicted for a transmission of the data that satisfies the error probability constraint in view of the channel measurements. The method further comprises selecting a preferred route from the plurality of candidate routes for sending the data based on the predicted transmission delays.

In a further aspect, a node in an IAB network is provided to perform the aforementioned method. The present disclosure also provides a computer program comprising instructions which, when executed on at least one processor, cause the at least one processor to carry out the aforementioned method. In a further aspect, the present disclosure provides a carrier containing the aforementioned computer program, wherein the carrier comprises one of: an electronic signal, an optical signal, a radio signal or a computer readable storage medium. In another further aspect, the present disclosure provides a computer program product comprising non-transitory computer-readable media having stored thereon the aforementioned computer program.

A still further aspect of the present disclosure provides a node in an IAB network for selecting a preferred route from a plurality of candidate routes for sending data from a first node to a second node in the IAB network. Each candidate route comprises at least one intermediate node between the first node and the second node. The node comprises a memory comprising instruction data representing a set of instructions and processing circuitry configured to communicate with the memory and to execute the set of instructions such that the processing circuitry is operable to, for each candidate route, determine a predicted transmission delay associated with sending the data along the respective candidate route based on channel measurements between nodes along the respective candidate route and an error probability constraint, wherein the transmission delay is predicted for a transmission of the data that satisfies the error probability constraint in view of the channel measurements. The processing circuitry is further operable to select a route from the plurality of candidate routes for sending the data based on the predicted transmission delays.

In a further aspect there is an intermediate node of an integrated access and backhaul, IAB, network, for use in selecting a preferred route from a plurality of candidate routes for sending data from a first node to a second node in the IAB network. The intermediate node is located between the first node and the second node along one or more of the candidate routes. The intermediate node comprises a memory comprising instruction data representing a set of instructions, and processing circuitry configured to communicate with the memory and to execute the set of instructions. The processing circuitry is operable to perform channel measurements on one or more links available to the intermediate node, and send the channel measurements to one of the first node and the second node for use in selecting a preferred route from the plurality of candidate routes for sending the data.

In a further aspect there is a method in an intermediate node of an integrated access and backhaul, IAB, network, for selecting a preferred route from a plurality of candidate routes for sending data from a first node to a second node in the IAB network. The intermediate node is located between the first node and the second node along one or more of the candidate routes. The method comprises: performing channel measurements on one or more links available to the intermediate node, and sending the channel measurements to one of the first node and the second node for use in selecting a preferred route from the plurality of candidate routes for sending the data.

Aspects of the disclosure thus provide methods, nodes and computer programs for efficiently routing data through an IAB network. By selecting a route based on predicted transmission delays for a plurality of candidate routes, aspects of the disclosure enable reduced end-to-end transmission delay when sending data through an IAB network. By predicting transmission delays for transmissions that satisfy an error probability constraint in view of channel measurements between nodes along the respective routes, route selection may be adapted to network conditions, whilst ensuring a transmission of a required quality. Thus an efficient and reliable route through the IAB network may be found.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
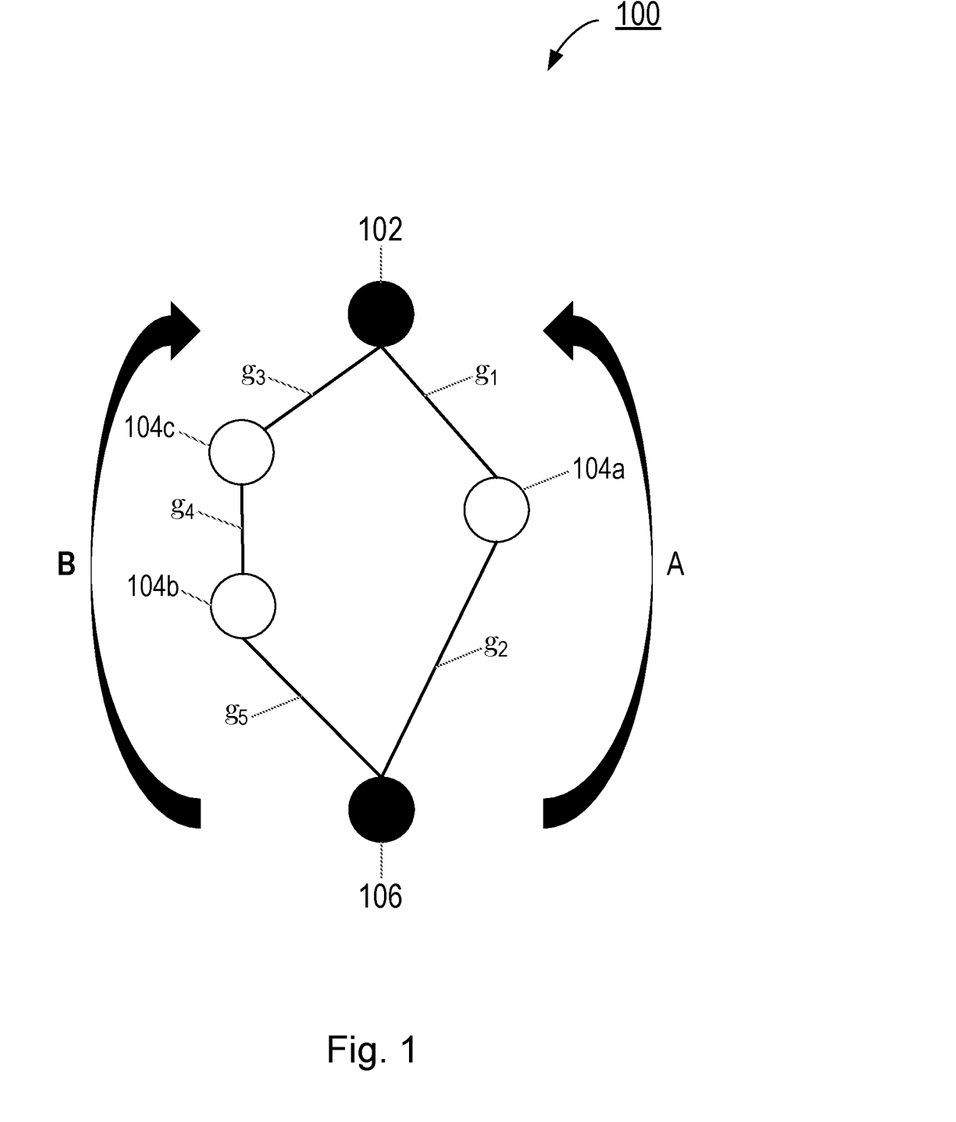
FIG. 1 illustrates an example integrated access and backhaul (IAB) network according to embodiments of the disclosure.

FIG. 1 shows an example of an integrated access and backhaul (IAB) network 100 according to some embodiments of the disclosure. The IAB network 100 may be configured to operate according to specific standards or other types of predefined rules or procedures. Thus, particular embodiments of the IAB network 100 may implement communication standards, such as Long Term Evolution (LTE), and/or other suitable 2G, 3G, 4G, or 5G standards; and/or any other appropriate wireless communication standard.

The IAB network 100 comprises an IAB donor 102, a plurality of IAB nodes 104a, 104b, 104c (collectively 104) and a wireless device 106.

The IAB donor 102 may be a base station such as, for example, a radio base station, a Node B, an evolved Node Bs (eNB) or a New Radio (NR) NodeBs (gNB). The IAB donor 102 may be connected to a core network (not illustrated) and may thus provide an interface between the IAB network 100 and the core network. For example, the IAB donor 102 may connect the plurality of IAB nodes 104 to the core network. The IAB donor may comprise an IAB donor according to the definition in the Third Generation Partnership Project (3GPP). For example, the IAB donor may comprise a radio access node (RAN node) which provides a UE's interface to the core network and wireless backhauling functionality to IAB-nodes. Generally therefore, the IAB donor 102 may provide backhauling (e.g. wireless backhauling) for the IAB nodes 104 in the IAB network 100. The IAB donor 102 may also provide an interface between one or more wireless devices in the IAB network 100 and the core network. The one or more wireless devices may be connected directly to the IAB donor 102 or indirectly to the IAB donor 102 via one or more IAB nodes 104 in the IAB network 100.

The IAB nodes 104 may be base stations such as, for example, radio base stations, Node Bs, eNBs or gNBs. Each of the IAB nodes 104 may be in communication with one or more wireless devices in the IAB network 100, thereby providing network access for the wireless devices. In the illustrated embodiment, only one wireless device 106 is shown, although the skilled person will appreciate that the IAB network 100 may comprise many more wireless devices.

In the illustrated embodiment, the IAB network 100 comprises a first IAB node 104a, a second IAB node 104b and a third IAB node 104c, although the skilled person will appreciate that the IAB network 100 may, in general, comprise a plurality of IAB nodes 104 and may, for example, comprise many more IAB nodes 104 than those shown.

Each of the IAB nodes 104 may be connected to the IAB donor 102, either directly (e.g. via a link between the respective IAB node 104 and the IAB donor 102) or via one or more other IAB nodes 104 in the IAB network 100. The links (otherwise known as "hops") between IAB nodes 104, and links between the IAB nodes 102 and any IAB nodes 104 may be wireless links.

Wireless devices in the IAB network 100 may thus be connected to the core network via one or more IAB nodes 104 and the IAB donor 102. For example, in the embodiment illustrated in FIG. 1, the wireless device 106 may send data to the core network via the first IAB node 104a and the IAB donor 102 (Route A), or via the second and third IAB nodes 104b, 104c and the IAB donor 102 (Route B). Similarly, the IAB node 102 may send data to the wireless device 106 via the first IAB node 104a, or via the second and third IAB nodes 104b, 104c.

Thus, there are two illustrated routes for sending data between the wireless device 106 and the IAB donor 102 in the IAB network 100. In addition, there may be different methods for transmitting data along the two routes. For example, there may be various methods for decoding and/or buffering the data. Some embodiments herein provide methods that jointly select i) an appropriate route and ii) a decoding scheme for said route. Put another way, methods herein may jointly determine the most efficient route and a codeword length with which to send the data along the selected route in order to optimise the transmission time whilst satisfying the error probability requirement.

Figure 2:
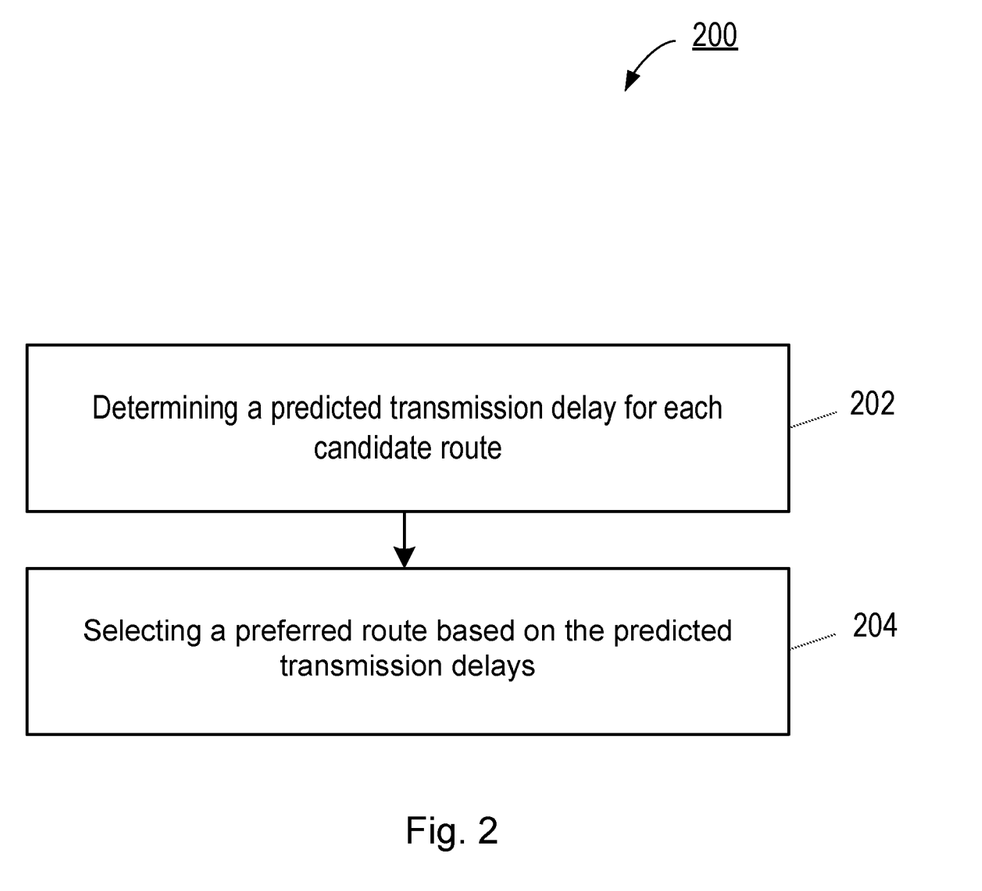
FIG. 2 shows an example method in a node according to embodiments of the disclosure.

FIG. 2 shows a flowchart of a method 200 in a node in an IAB network for selecting a preferred route from a plurality of candidate routes for sending data from a first node to a second node in the IAB network according to embodiments of the disclosure. Each candidate route comprises at least one intermediate node between the first node and the second node. The IAB network may be the IAB network 100 described above in respect of FIG. 1, for example. The node may be an IAB donor such as, for example, the IAB donor 102 described above in respect of FIG. 1.

One of the first node and the second node may be a wireless device such as, for example, the wireless device 106 described above in respect of FIG. 1. The other of the first node and the second node may be an IAB donor such as, for example, the IAB donor 102 described above in respect of FIG. 1. Thus, for example, the method may be for selecting a preferred route for sending data from a wireless device to an IAB donor in an IAB network. In alternative example, the method may be for selecting a preferred route for sending data from an IAB donor to a wireless device in an IAB network. In either example, the IAB donor may be, for example, a base station such as a radio base station, Node B, eNB or gNB. The IAB donor may be connected to a core network, thereby providing an interface between the IAB network and the core network.

In this context, the "preferred" route may comprise the route that is subsequently selected or elected for sending the data through the IAB network. It may comprise an optimal route, for example, in view of (e.g. given the constraints imposed by) the channel measurements and the error probability constraint.

It is noted that in IAB networks, Uplink (UL) and downlink (DL) transmission does not follow the common definition, as both endpoints of the backhaul links are IAB nodes. However, for simplicity, data transmission towards the IAB donor may be considered as UL and transmission form the IAB donor may be considered as DL. Generally (unless stated otherwise) embodiments of the method 200 apply to both UL and DL transmissions (e.g. transmissions from the wireless device to the IAB donor as well as transmissions from the IAB donor to the wireless device).

As noted above, each candidate route comprises at least one intermediate node (e.g. in the IAB network) between the first node and the second node. The at least one intermediate node may be an IAB node such as, for example, any of the IAB nodes 104 described above in respect of FIG. 1. Each candidate route further comprises links between nodes along the respective route. The links may be, for example, backhaul links (e.g. wireless backhaul links).

In brief, in a first step 202 the method 200 comprises, for each candidate route, determining a predicted transmission delay associated with sending the data along the respective candidate route based on channel measurements between nodes along the respective candidate route and an error probability constraint, wherein the transmission delay is predicted for a transmission of the data that satisfies the error probability constraint in view of the channel measurements. In a second step 204, the method then comprises selecting a preferred route from the plurality of candidate routes for sending the data based on the predicted transmission delays.

In particular aspects, a decoding and/or buffering scheme may be adapted for each of the plurality of candidate routes based on the channel measurements for the respective routes such that a transmission along a respective candidate route using the determined decoding and/or buffering scheme would satisfy the error probability constraint whilst resulting in the optimal transmission delay for that route. The decoding and/or buffering scheme for sending the data from the first node to the second node may thus be adapted (e.g. optimised) according to the channel conditions along the respective route, thereby further improving the likelihood that the transmitted data will be received.

Aspects of the disclosure thus provide an adaptive approach to selecting routes for sending data in an IAB network. By selecting a preferred route based on predicted transmission delays for a transmission with an optimal codeword length determined for the route (e.g. that results in a transmission that satisfies the error probability constraint with minimal transmission delay), embodiments of the disclosure enable reducing the end-to-end transmission delay when sending data through an IAB network. Further, determining the predicted transmission delays using an error probability constraint and channel measurements between nodes along the respective routes allows for adapting route selection to network conditions, whilst enabling the transmitted data to be reliably received.

Methods herein thus minimise the end-to-end transmission delay with no loss in terms of end-to-end error probability.

In more detail, in step 202, as noted above, for each candidate route, a predicted transmission delay associated with sending the data along the respective candidate route is determined. In brief, a transmission delay is a measure of the time it takes the data to get from the first node to the second node (e.g. a transmission send time). The predicted transmission delay is an estimate of the transmission delay that would be observed, were the data to be sent (e.g. transmitted) along the respective candidate route.

The predicted transmission delay is determined based on channel measurements between nodes along the respective candidate route. The nodes along the route may comprise the first node, the second node and the at least one intermediate node. For example, for a candidate route having one intermediate node, the channel measurements may comprise a first channel measurement between the first node and the intermediate node and a second channel measurement between the intermediate node and the second node.

An error probability constraint is also applied, such that only possible transmissions along the candidate route that satisfy the error probability constraint are considered in the prediction. The error probability constraint may indicate a limit on a likelihood of an error occurring when transmitting the data from the first node to the second node. For example, the error probability constraint may indicate a limit (e.g. an upper limit) on a likelihood of some or all of the data not being received at the second node. The error probability constraint may thus be indicative of an acceptable or tolerable risk of an error occurring when sending the data.

As will be described in more detail below, transmission delays along a candidate route may depend on various factors, such as, for example, the decoding and/or buffering scheme used to transmit the data. These factors may also affect the probability of an error occurring when transmitting data along the respective candidate route. For example, a particular decoding scheme may decrease the probability of an error occurring when transmitting data along a candidate route, but may also increase the transmission delay (e.g. the time taken to send the data).

The error probability constraint may be received, for example, from another node. For example, if the method is performed in an IAB donor, then the IAB donor may receive the error probability constraint from a node in a core network. In another example, the error probability constraint may be received from the first node (e.g. the node from which data is to be sent). Thus, for example, if the first node is a wireless device, then the error probability constraint may be received from the wireless device.

Alternatively, the error probability constraint may be determined (e.g. at the node) based on one or more of the following: an importance of the data to be sent (e.g. a priority or sensitivity level) and/or a quality of service attached to the data or data type. For example, an error probability constraint for data with a higher priority level may be lower than an error probability constraint for data with a lower priority level.

The channel measurements for a respective route may comprise measurements that are indicative of a channel quality between nodes along the route (e.g. between two or more of: the first node, the second node and one or more of the at least one intermediate nodes). The channel measurements may comprise measurements performed by the nodes along the candidate routes (e.g. by one or more of the first node, the second node and the at least one intermediate node). In particular embodiments, the channel measurements may comprise gain measurements and/or signal to noise (SNR) measurements performed by the nodes along the respective candidate route. In embodiments in which the channel measurement comprise gain measurements, the method may further comprise obtaining (e.g. receiving) a transmission power for nodes along the respective candidate route. The transmission power may be comprised in the channel measurements, or the transmission power may be obtained separately.

The channel measurements may be received from the nodes along each of the candidate routes. For example, the channel measurements for the nodes along each of the candidate routes may be received in response to receiving a request, at the each of the nodes (e.g. the second node and the at least one intermediate node), for channel measurements. In the embodiment described above in respect of FIG. 1, for example, channel measurements may be received from each of the IAB nodes 104. For example, the method 200 may comprise receiving gain measurements $g_1$ and $g_2$ for the links in route A and gain measurements $g_3$, $g_4$ and $g_5$ for the links in route B. The method may further comprise obtaining transmission powers corresponding to the gain measurements. For example, the method may comprise receiving transmission powers $P_{IAB1}$ and $P_{WD}$ for the first IAB node 104a and the wireless device 106, corresponding to gain measurements $g_2$ and $g_1$ respectively.

Generally the channel measurements may be provided by an intermediate node, for example, an intermediate node may perform steps of performing channel measurements on one or more links available to the intermediate node and sending the channel measurements to one of the first node and the second node (e.g. the node performing the method 200), for use in selecting a preferred route from the plurality of candidate routes for sending the data.

The error probability constraint may thus be used, with the channel measurements for each of the respective candidate routes as constraints with which to determine or predict a transmission delay for each candidate route. The predicted transmission delay is determined for a (e.g. hypothetical) transmission that satisfies or would satisfy (e.g. meets or would meet) the error probability constraint in view of (e.g. given) the channel measurements. The predicted transmission delay is thus determined for a transmission that satisfies the error probability constraint subject to the channel measurements (e.g. based on constraints imposed by the channel measurements). In particular examples, the predicted transmission delay for a respective route may comprise the minimum predicted transmission delay that can be achieved for a transmission of the data along the route whilst still satisfying the error probability constraint. For example, some transmissions may result in a lower error probability than required by the error probability constraint. Thus in some embodiments, the transmission delay may be predicted for a transmission that (e.g. just or exactly) satisfies the error probability constraint. In other examples, the predicted transmission delay may be any predicted transmission delay that can be achieved along the route whilst still satisfying the error probability constraint. For example, instead of calculating the minimum transmission delay that may be achieved, a tolerance may be applied to better guarantee that the error probability constraint is satisfied (e.g. this may take into account any errors associated with the channel measurements).

The skilled person will appreciate that there may be many ways for determining the predicted transmission delay for each candidate route based on an error probability constraint and the channel measurements along the respective candidate route. In particular embodiments, determining the predicted transmission delay for sending data along a candidate route may comprise determining a decoding and/or buffering scheme for the candidate route that results in (or would result in) a transmission of the data satisfying the error probability constraint. The predicted transmission delay for the candidate route may then be determined based on the decoding and/or buffering scheme.

Figure 3:
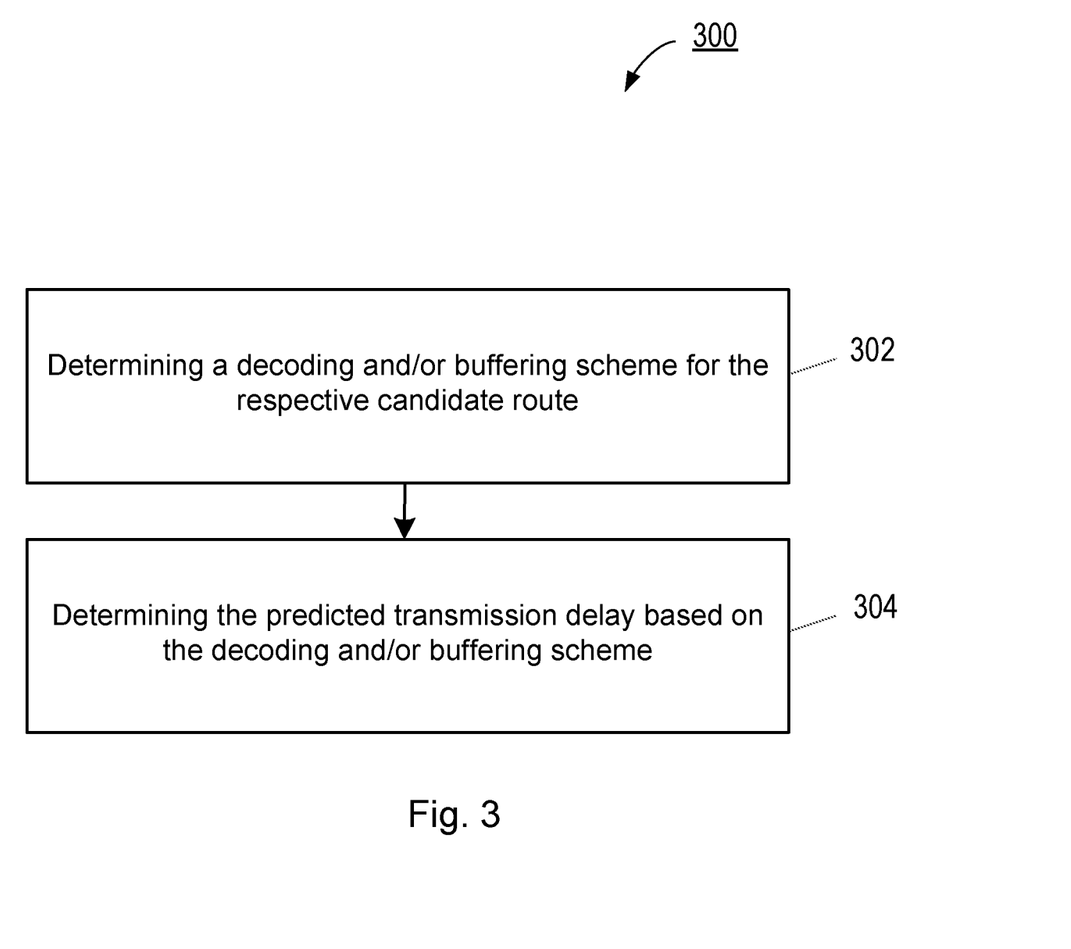
FIG. 3 shows a further example method in a node according to embodiments of the disclosure.

This is illustrated in respect of FIG. 3 which shows an example method 300 in a node of an IAB network for determining a predicted transmission delay for sending data from a first node to a second node along a candidate route according to some embodiments of the disclosure. The steps of the method 300 may be performed as part of step 202 described above in respect of FIG. 2. In this manner, joint selection of route and variable-length coding may be performed. The transmission delay for each route is thus optimised (or actively adapted) by selecting a codeword that reduces the transmission delay whilst ensuring that the error probability constraint is met.

In step 302 a decoding and/or buffering scheme for the respective candidate route that results in (or would result in) a transmission that satisfies the error probability constraint is determined based on the channel measurements for the candidate route.

The skilled person will be familiar with different decoding schemes, which may correspond to particular coding schemes (e.g. be suitable for or designed to decode signals that are encoded using particular coding schemes). Examples of decoding schemes include (but are not limited to) decoding schemes corresponding to Raptor codes (see, for example, "Raptor codes", A. Shokrollahi, IEEE Transactions on Information Theory, vol. 52, no. 6, pp. 2551-2567, June 2006) and decoding schemes corresponding to low-density parity-check-based (LDPC-based) coding schemes such as, for example, LDPC-based coding schemes designed for hybrid automatic repeat request (HARQ) protocols (see, for example, "Incremental redundancy hybrid ARQ schemes based on low-density parity-check codes," S. Sesia, G. Caire and G. Vivier, *IEEE Transactions on Communications*, vol. 52, no. 8, pp. 1311-1321, August 2004). The skilled person will further appreciate that the methods herein may be adapted according to the decoding scheme used. For example, there may generally be different lengths of codewords (e.g. for a variable length coding scheme) and the decoding may be adapted based on the length. For instance, in some iterative decoding methods, the number of iterations may change depending on the codeword length (and correspondingly, the decoding delay may change).

The skilled person will also be familiar with different buffering schemes. A determination of a buffering scheme may be relevant in situations in which a size of a signal to be sent exceeds a signal size limit (e.g. for one or more nodes along a candidate route). In order to avoid exceeding the signal size limit, the signal (e.g. a codeword) may be divided into a plurality of sub-signals (e.g. sub-codewords) to be sent in separate messages. A node receiving the messages may store each of the sub-signals in a buffer until all of the sub-signals have been received. A buffering scheme may specify, for example, the number of sub-signals that may be stored in the buffer. In general, the skilled person will appreciate that a buffering scheme may specify one or more of the following: a buffer size (e.g. a maximum buffer size) and a number of sub-signals to be stored in a buffer.

In particular embodiments, determining a decoding and/or buffering scheme for the candidate route comprises determining a codeword length for the transmission that satisfies the error probability constraint. The codeword length may be determined using the channel measurements and the error probability constraint. That is, the channel measurements may be used to determine a codeword length (e.g. a minimum codeword length) for the transmission that satisfies the error probability constraint.

For a candidate route comprising n links, a codeword length, L, that satisfies the error probability constraint $\epsilon$ in view of (e.g. given or subject to) the channel measurements may be determined using the relationship:

$$\epsilon = 1 - \prod_{i=0}^{n-1}(1 - \epsilon_i(L, x_i)),$$

in which $\epsilon_i$ is the error probability for a link l along the candidate route and $x_i$ is a channel measurement for the link i. The codeword length may be determined, for example, by solving:

$$L = \arg_l\left\{\epsilon = 1 - \prod_{i=0}^{n-1}(1 - \epsilon_i(l, x_i))\right\}.$$

In particular examples, the codeword length L may be determined by finding a minimum value of L that satisfies the aforementioned relationship given the channel measurements $x_i$. The skilled person will appreciate that there may be many suitable processes that may be used for determining a codeword length using the aforementioned relation such as, for example, a root-finding process or a minimization process.

The error probability for a link i may be further dependent on a size of the data to be sent, K (e.g. $\epsilon_i = \epsilon_i(L, x_i, K)$). In some examples, the error probability for sending data of size K using a signal of length L (e.g. a codeword length L) over a link with a signal-to-noise ratio, x, may be given by:

$$\epsilon = Q\left(\frac{\sqrt{L}\left(\log(1+x) - \frac{K}{L}\right)}{\sqrt{1 - \frac{1}{(1+x)^2}}}\right),$$

in which Q is a Gaussian Q function. For a link with gain, g, and transmission power, P, the signal-to-noise ratio may be determined according to x=gP. In general, the skilled person will appreciate that this is merely an example and that the form of the relationship for the error probability may depend on the coding method used to transmit the data or on the decoding and/or buffering scheme.

Accordingly, the decoding and/or buffering scheme (e.g. the codeword length) for a candidate route may be further determined based on a size of the data to be sent. For example, the codeword length for a respective candidate route may determined based on channel measurements between nodes along the candidate route, the error probability constraint and the size of the data to be sent (e.g. using the aforementioned relationship for the error probability).

Thus, in the embodiment described above in respect of FIG. 1, for example, a codeword length for sending data with size K from the wireless device 106 to the IAB donor 102 via candidate route A may be determined using:

$$L_A = \arg_l\{1-(1-\epsilon_1(l))(1-\epsilon_2(l))=\varepsilon\},$$

in which $\epsilon_1$ and $\epsilon_2$ are error probabilities for sending data between the first IAB node 104a and the IAB donor 102, and the wireless device 106 and the IAB node 104a respectively:

$$\epsilon_1(l) = Q\left(\frac{\sqrt{l}\left(\log(1+P_{IAB}g_1) - \frac{K}{l}\right)}{\sqrt{1 - \frac{1}{(1+P_{IAB}g_1)^2}}}\right);$$

$$\epsilon_2(l) = Q\left(\frac{\sqrt{l}\left(\log(1+P_{WD}g_2) - \frac{K}{l}\right)}{\sqrt{1 - \frac{1}{(1+Pg_2)^2}}}\right),$$

in which $P_{WD}$ is the transmission power of the wireless device 106 and $P_{IAB}$ is the transmission power of the IAB node 104a.

Similarly, a codeword length for sending the data of size K from the wireless device 106 to the IAB donor 102 via candidate route B may be determined using:

$$L_B = \arg_l\{1-(1-\epsilon_3(l))(1-\epsilon_4(l))(1-\epsilon_5(l))=\varepsilon\},$$

in which $\epsilon_3$, $\epsilon_4$ and $\epsilon_5$ are error probabilities for sending data between the nodes along route B:

$$\epsilon_3(l) = Q\left(\frac{\sqrt{L_B}\left(\log(1+P_{UE}g_5) - \frac{K}{L_B}\right)}{\sqrt{1 - \frac{1}{(1+P_{UE}g_5)^2}}}\right);$$

$$\epsilon_4(l) = Q\left(\frac{\sqrt{L_B}\left(\log(1+Pg_4) - \frac{K}{L_B}\right)}{\sqrt{1 - \frac{1}{(1+Pg_4)^2}}}\right);$$

$$\epsilon_5(l) = Q\left(\frac{\sqrt{L_B}\left(\log(1+Pg_3) - \frac{K}{L_B}\right)}{\sqrt{1 - \frac{1}{(1+Pg_3)^2}}}\right).$$

As shown in the examples provided above, the predicted transmission delay may be predicted based on using a single codeword length for the entire route (e.g. the same codeword length may be used for transmitting the data between each pair of nodes/link in the route). Alternatively, one or more codeword lengths may be determined for different sections of the route. For example, a respective codeword length for the transmission may be determined for each link in a candidate route. Put another way, different codeword lengths may be determined for different links (e.g. hops) in the candidate route. This may increase the efficiency further, ensuring that the transmission of the data between each link is optimised.

Thus, in particular embodiments, determining a decoding and/or buffering scheme for a respective candidate route that satisfies the error probability constraint comprises determining a codeword length for the route. The skilled person will appreciate, however, that there may be many suitable types of decoding and/or buffering schemes (see, for example, the decoding schemes described above), and therefore there are many suitable ways for determining a decoding and/or buffering scheme for a respective candidate route according to aspects of the present disclosure.

In step 304, a predicted transmission delay is determined for the respective candidate route based on the decoding and/or buffering scheme.

In embodiments in which a respective codeword length is determined for each candidate route, the predicted transmission delay $\mathcal{T}$ for a route may be calculated according to the relationship:

$$\mathcal{T} = L\left(1 + \sum_{i=0}^{n-2}\prod_{j=0}^{i}(1 - \epsilon_j(L))\right),$$

in which the respective candidate route comprises n links and $\epsilon_j(L)$ is an error probability associated with sending data with a signal length (e.g. codeword length) L over a link between a jth node and a (j+1)th node along the candidate route. The error probability associated with sending data over a link may be, for example, a probability of a decoding error occurring when sending data over the link. For example, the error probability associated with sending data over a link between a jth node and a (j+1)th node may be a probability of an error occurring when decoding the encoded data at the (j+1)th node. Thus, the predicted transmission delay for a candidate route may depend on a probability of a decoding error for the respective candidate route.

In some embodiments, the predicted transmission delay may be further determined based on a decoding delay. The decoding delay for a respective candidate route may be dependent on the codeword length for that route. The predicted transmission delay for a route may be calculated according to the relationship:

$$\mathcal{T} = (L + \Lambda(L))\left(1 + \sum_{i=0}^{n-2}\prod_{j=0}^{i}(1 - \epsilon_j(L))\right),$$

in which the respective candidate route comprises n links, $\Lambda(L)$ is a decoding delay, and $\epsilon_j(L)$ is an error probability associated with sending data with a signal length L over a link between a jth node and a (j+1)th node along the candidate route. The skilled person will appreciate that this expression may be adapted for routes in which different codeword lengths are used for each link in the route.

Thus, for example, in the embodiments described above in respect of FIG. 1, the predicted transmission delay for sending data from the wireless device 106 to the IAN node 102 via route A may be calculated using:

$$\mathcal{T}_A = L_A + \Lambda(L_A) + (L_A + \Lambda(L_A))(1 - \epsilon_1(L_A)),$$

in which $L_A$ is a codeword length for route A determined using the methods outlined above in respect of step 302. Similarly, the predicted transmission delay for sending data from the wireless device 106 to the IAN node 102 via route B may be calculated using:

$$\mathcal{T}_B = L_B + \Lambda(L_B) + (L_B + \lambda(L_B))(1 - \epsilon_3(L_B)) + (L_B + \Lambda(L_B))(1 - \epsilon_3(L_B))(1 - \epsilon_4(L_B)),$$

in which $L_B$ is a codeword length for route B determined using the methods outlined above in respect of step 302.

In this way, a decoding and/or buffering scheme may be determined for each candidate route through the IAB network, which when used to send the data along the route, results in a transmission that satisfies an error probability constraint (given the channel measurements along the route).

As described above, a decoding and/or buffering scheme may be determined for transmitting data along each candidate route through the IAB network. Accordingly, the skilled person will appreciate that the method may comprise, in step 302, determining only a decoding scheme for each of the candidate routes (e.g. rather than a decoding and buffering scheme). The predicted transmission delay for a candidate route may thus be determined based on the decoding scheme, without taking into account any buffering scheme that may be used. For example, it may be assumed that a same buffering scheme may be used regardless of the route used, and therefore the particular buffering scheme may not affect route selection. The skilled person will thus appreciate that in particular embodiments, a decoding scheme, rather than a decoding and buffering scheme, is determined for each candidate route, and the predicted transmission delay is determined based on the decoding scheme.

Turning back to FIG. 2, generally therefore, as noted above, in some embodiments of step 202, the predicted transmission delay may further be determined based on a predicted decoding delay for each respective candidate route. That is, the data to be send from the first node to the second node may be encoded (e.g. using channel coding) for transmission between each of the nodes along the respective route. The time taken to decode the received data at each of the nodes along the respective route may, for example, increase the time taken for the data to be sent from the first node to the second node, thereby increasing the predicted transmission delay. In particular aspects, the method may therefore further comprise determining a predicted decoding delay for each candidate route and determining the predicted transmission delay for a respective route based on the associated predicted decoding delay.

The predicted decoding delay may be affected by the buffering and/or decoding scheme to be used (e.g. a buffering and/or decoding scheme that has been determined for a particular candidate route, for example as described above with respect to FIG. 3). For example, the predicted decoding delay may depend on a codeword length determined for the candidate route. In particular examples, the codeword length determined for a candidate route may exceed a signal length limit (e.g. a maximum length for a signal transmitted along the respective candidate route). The signal length limit may be, for example, specific to the candidate route or the IAB network.

In order to comply with the signal length limit, the codeword (e.g. the signal to be sent) may be divided into a plurality of sub-codewords for transmission. The sub-codewords may be sent in separate messages (e.g. each sub-codeword may be sent in a different message). On receipt of the sub-codewords, a node along the candidate route may concatenate the sub-codewords and decode the concatenated signal to obtain the data. For example, the node may store each of the sub-codewords in a buffer on receipt, and only perform decoding once all of the sub-codewords have been received.

The predicted transmission delay for each candidate route may, additionally or alternatively, be further determined based on an error probability for the candidate route. For example, the predicted transmission delay may be further determined based on a probability of a decoding error for the respective candidate route. The method may thus, for example, comprise determining a probability of a decoding error occurring when sending data along each candidate route. The probability of a decoding error may be determined based on the buffering or decoding scheme to be used. For example, the probability of a decoding error may be determined using the relationship for the error probability described above in respect of FIG. 3. The method may thus further comprise determining a probability of a decoding error occurring for one or more links along the respective candidate route and using the determined decoding error probabilities to calculate a predicted transmission delay.

The predicted transmission delay for each candidate route may, additionally or alternatively, be further determined based on one or more scheduling delays for nodes in the respective route. The scheduling delays may be, for example, indicated to the node by the nodes along each of the respective routes. The scheduling delays may determined based on, for example, a number of wireless devices in the IAB network and/or a number of a particular type of wireless device in the IAB network (e.g. a number of consumer premises equipments).

The skilled person will also appreciate that nodes in the IAB network may, in general, comprise one or more antennas. Therefore, each of the first node, the second node and any nodes along the candidate routes may comprise any number of antennas. Accordingly, the predicted transmission delay for a candidate route may be further determined based on a beamforming process used by one or more nodes along the candidate route.

Turning now to step 204 of the method 200, the method then comprises selecting a preferred route from the plurality of candidate routes for sending the data based on the predicted transmission delays. The skilled person will appreciate that the preferred route may be, for example, a route that is to be used for sending the data from the first node to the second node (e.g. an elected route).

The route may be selected by comparing the predicted transmission delays for each of the candidate routes. In particular embodiments, selecting the route comprises selecting the candidate route with the smallest (e.g. minimum) predicted transmission delay. Alternatively, selecting the route may comprise selecting the candidate route with a predicted transmission delay below a predetermined threshold value (e.g. to meet a quality of service requirement).

In the embodiment described above in respect of FIG. 1, the predicted transmission delays of route A and route B, $\mathcal{T}_A$ and $\mathcal{T}_B$, may be compared in order to select a route. For example, if $\mathcal{T}_A < \mathcal{T}_B$, then route A may be selected. Alternatively, if $\mathcal{T} T_B < \mathcal{T}_A$, then route B may be selected.

Once a route from the plurality of candidate routes has been selected (e.g. after the step 204), the method may further comprise initiating sending the data from the first node to the second node along the selected route. For example, if the method is performed in the first node, the method may further comprise sending the data to the subsequent node along the route. Alternatively, if the method is performed in another node (e.g. the second node), the method may comprise sending a message to the first node indicating that the first node is to send the data via the preferred (e.g. selected) route.

In embodiments in which the predicted transmission delays for the candidate routes are determined based on decoding and/or buffering scheme for the candidate route, initiating sending the data from the first node to the second node may comprise initiating sending the data from the first node to the second node using the decoding and/or buffering scheme.

For example, as was discussed above, determining the decoding and/or buffering scheme for a respective candidate route may comprise determining a codeword length, L, for sending data along the respective candidate route. In which case, initiating sending the data from the first node to the second node may comprise encoding the data to obtain a codeword of length, L. The method may further comprise dividing the encoded data (e.g. the codeword) into n sub-codewords of length C, in which C is a number of time-frequency symbols available (e.g. in time slot or resource block). The sub-codewords may be sent to the first node along the selected route in successive time slots. In particular examples, the sub-codewords may be sent to the first node without waiting for any acknowledgement from the first node. The first node may receive and buffer the signal in n successive time slots. The first node may, for example, only decode the message when all n sub-codewords are received.

In embodiments in which the predicted transmission delay for each candidate route is determined based on a beamforming process for one or more nodes along the respective candidate route, initiating sending the data from the first node to the second node may comprise initiating sending the data along the candidate route using the beamforming process. For example, the node may indicate, to the nodes along the selected route, a beamforming process to be used for transmitting the data to used when transmitting the data to a subsequent node in the route.

Although the aforementioned embodiments have been described in the context of selecting a preferred route for sending data from a first node to a second node, the skilled person will appreciate that the methods described herein may be applied more generally to selecting a preferred route from sending data from one or more first nodes to one or more second nodes. For example, the methods described herein may be used to select routes for sending data from a plurality of wireless devices to an IAB node in an IAB network. In another example, the methods described herein may be used to select routes for sending data from an IAB node to a plurality of wireless devices in an IAB network. In such situations, the predicted transmission delays for each candidate route for each data to be sent may be further determined based on a scheduling process used for scheduling transmissions in the IAB network. The scheduling process may be used to determine one or more scheduling delays, which may be used when determining the predicted transmission delay.

Embodiments of the disclosure thus provide methods for selecting a preferred route for sending data from a first node to a second node in an IAB network. By selecting the route using a predicted transmission delay, which is determined based on channel measurements between nodes along a plurality of candidate routes and an error probability constraint, embodiments of the disclosure adapt the routing of data in IAB network according to network conditions, whilst still enabling the data to be reliable received. Embodiments herein use an adaptive approach to reduce the end-to-end transmission delay in multi-hop IAB networks with no loss in terms of end-to-end error probability. Depending on the channel's quality and the size of the buffered data, different data transmission paths are selected. In some embodiments, variable-length coding is used and the decoding and/or buffering schemes of the nodes are adapted to guarantee the end-to-end error probability requirement.

Generally, the proposed methods reduce end-to-end transmission and the scheduling delay while guaranteeing the UEs end-to-end error probability requirements. Thus, the end-to-end throughput may increase, and the buffering cost of the network is reduced. Furthermore, the nodes may use the spectrum resources which have become free, due to the optimized data transmission approach, to serve more users. This may provide an opportunity to increase the number of users per hop and/or the number of hops. In this way, methods herein may enable the number of users per hop (e.g. link) to be increased in dense IAB networks. As described above, the proposed methods are applicable for both downlink (DL) and uplink (UL) transmissions (as defined above).

Figure 4:
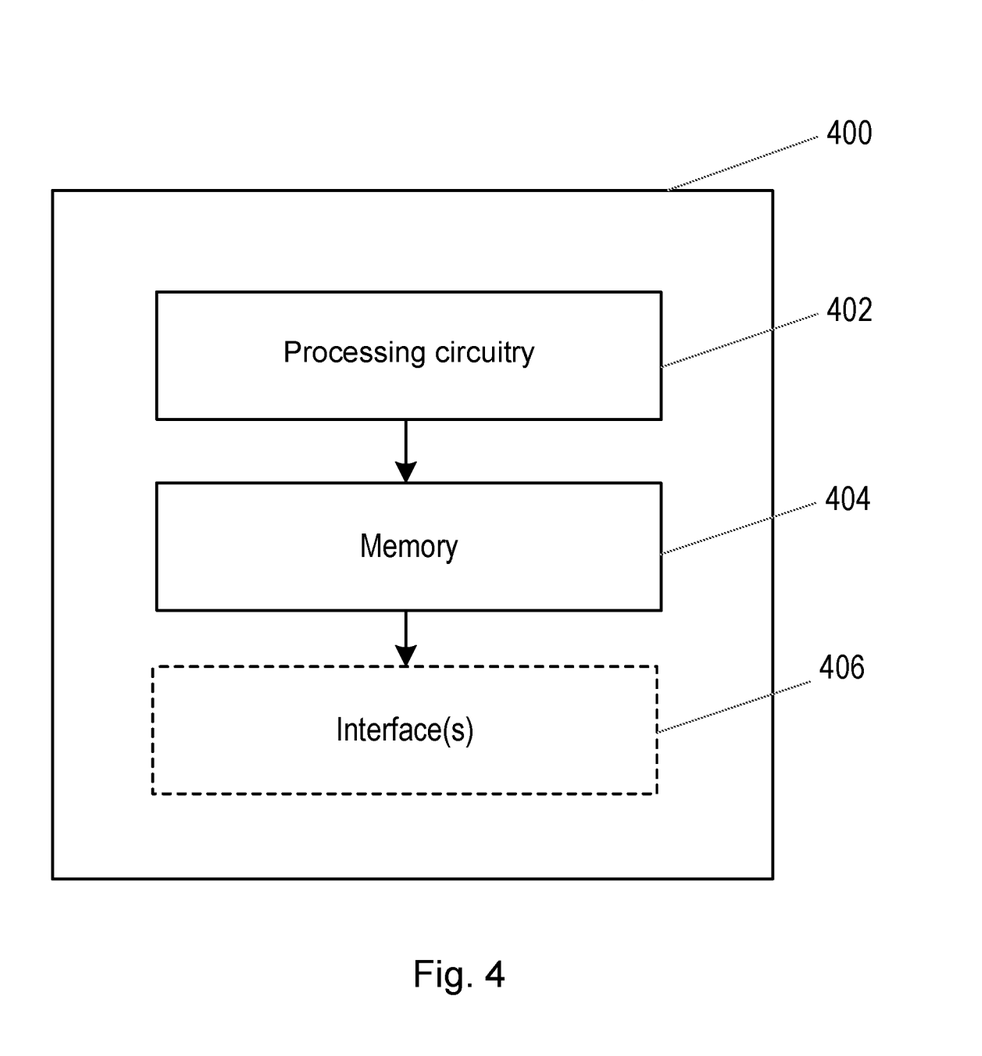
FIG. 4 shows an example node according to embodiments of the disclosure.

Turning now to other embodiments, as illustrated in FIG. 4, in some embodiments there is a node 400 in an IAB network for selecting a preferred route from a plurality of candidate routes for sending data from a first node to a second node in the IAB network according to some embodiments herein. Each candidate route comprises at least one intermediate node between the first node and the second node. The node 400 is configured (e.g. adapted or programmed) to perform any of the embodiments of the method 200 or the method 300 as described above.

Generally, the node 400 may comprise any component or network function (e.g. any hardware or software module) in the communications network suitable for performing the functions described herein. For example, a node may comprise equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

In particular examples, the node 400 may be an IAB donor. The node 400 may thus, for example, comprise equipment capable, configured, arranged and/or operable to communicate directly or indirectly with one or more IAB nodes in the IAB network. The node 400 may additionally comprise equipment capable, configured, arranged and/or operable to communicate directly or indirectly with one or more core network nodes. The node 400 may thus, for example, provide an interface between one or more IAB nodes and a core network.

The node 400 may be configured or operative to perform the methods and functions described herein, such as embodiments of the method 200 or the method 300 described above. The node 400 may comprise processing circuitry (or logic) 402. It will be appreciated that the node 400 may comprise one or more virtual machines running different software and/or processes. The node 400 may therefore comprise one or more servers, switches and/or storage devices and/or may comprise cloud computing infrastructure or infrastructure configured to perform in a distributed manner that runs the software and/or processes.

The processor 402 may control the operation of the node 400 in the manner described herein. The processor 402 can comprise one or more processors, processing units, multi-core processors or modules that are configured or programmed to control the node 400 in the manner described herein. In particular implementations, the processor 402 can comprise a plurality of software and/or hardware modules that are each configured to perform, or are for performing, individual or multiple steps of the functionality of the node 400 as described herein.

The node 400 may comprise a memory 404. In some embodiments, the memory 404 of the node 400 can be configured to store program code or instructions (e.g. instruction data representing a set of instructions) that can be executed by the processor 402 of the node 400 to perform the functionality described herein. Alternatively or in addition, the memory 404 of the node 400, can be configured to store any requests, resources, information, data, signals, or similar that are described herein. The processor 402 of the node 400 may be configured to control the memory 404 of the node 400 to store any requests, resources, information, data, signals, or similar that are described herein.

It will be appreciated that the node 400 may comprise other components in addition or alternatively to those indicated in FIG. 4. For example, in some embodiments, the node 400 may comprise a communications interface 406. The communications interface 406 may be for use in communicating with other nodes in the communications network, (e.g. such as other physical or virtual nodes). For example, the communications interface 406 may be configured to transmit to and/or receive from other nodes or network functions requests, resources, information, data, signals, or similar. The processor 402 of node 400 may be configured to control such a communications interface 406 to transmit to and/or receive from other nodes or network functions requests, resources, information, data, signals, or similar.

Briefly, in some embodiments, the node 400 may be configured, for each candidate route, to determine a predicted transmission delay associated with sending the data along the respective candidate route based on channel measurements between nodes along the respective candidate route and an error probability constraint for the data, wherein the transmission delay is predicted for a transmission of the data that satisfies the error probability constraint in view of the channel measurements. The node 400 may be further configured to select a preferred route from the plurality of candidate routes for sending the data based on the predicted transmission delays.

Determining, for each candidate route, a predicted transmission delay associated with sending the data along the respective route based on channel measurements between nodes along the respective candidate route and an error probability constraint for the data was described in detail with respect to the method 200 in block 202 and the method 300 and the detail therein will be appreciated to apply equally to embodiments of the node 400.

Selecting a preferred route from the plurality of candidate routes for sending the data based on the predicted transmission delays was also described in detail with respect to the method 200 in block 204 and the detail therein will be appreciated to apply equally to embodiments of the node 400.

In some embodiments, for example, the processor is further caused to determine a predicted transmission delay for each candidate route by determining a decoding and/or buffering scheme for a respective candidate route that results in a transmission that satisfies the error probability constraint based on the channel measurements for a respective candidate route, and determining the predicted transmission delay for the respective candidate route based on the decoding and/or buffering scheme. This was also described in detail with respect to method 300 in blocks 302 and 304 and the detail therein will be appreciated to apply equally to some embodiments of the node 400.

In this way a node is provided that is capable of reducing end-to-end transmission delay by selecting a preferred route for sending data in an IAB network based on predicted transmission delays. By determining the predicted transmission delays using channel measurements and an error probability constraint, the node adapts route selection to network conditions, whilst enabling the transmitted data to be reliably received.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of methods described herein, such as embodiments of the methods 200 or 300 described above in respect of FIGS. 2 and 3.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method in a node of an integrated access and backhaul, IAB, network, for selecting a preferred route from a plurality of candidate routes for sending data from a first node to a second node in the IAB network, each candidate route comprising at least one intermediate node between the first node and the second node, the method comprising:
for each candidate route, determining a predicted transmission delay associated with sending the data along the respective candidate route based on channel measurements between nodes along the respective candidate route and an error probability constraint, the transmission delay being predicted for a transmission of the data that satisfies the error probability constraint in view of the channel measurements; and
selecting a preferred route from the plurality of candidate routes for sending the data based on the predicted transmission delays, the selecting of the preferred route from the plurality of candidate routes comprises selecting the route with a smallest predicted transmission delay.

2. The method of claim 1, wherein the channel measurements comprise one or more of gain measurements and signal to noise measurements performed by nodes along the respective candidate route.

3. The method of claim 1, wherein determining the predicted transmission delay for each candidate route comprises:
based on the channel measurements for the respective candidate route, determining one or more of a decoding and a buffering scheme for the respective candidate route that results in the transmission satisfying the error probability constraint; and
determining the predicted transmission delay for the respective candidate route based on the one or more of the decoding and the buffering scheme.

4. The method of claim 3, wherein determining the one or more of the decoding and the buffering scheme for the respective candidate route comprises: determining a codeword length for the transmission that satisfies the error probability constraint.

5. The method of claim 4, wherein each candidate route comprises a plurality of links between nodes along the respective candidate route, and determining the codeword length for the respective candidate route comprises determining the respective codeword length for the transmission between each of the links in the candidate route.

6. The method of claim 1, wherein the predicted transmission delay for each candidate route is further determined based on one or more of:
a predicted decoding delay for each respective candidate route;
a probability of a decoding error for the respective candidate route; and
one or more scheduling delays for the intermediate nodes along the respective candidate route.

7. The method of claim 1 further comprising:
initiating sending the data from the first node to the second node along the preferred route.

8. The method of claim 1, wherein one of the first node and the second node is a wireless device and the other of the first node and the second node is an IAB donor.

9. The method of claim 1, wherein the IAB network is a multi-hop IAB network.

10. A node in an integrated access and backhaul, IAB, network, for selecting a preferred route from a plurality of candidate routes for sending data from a first node to a second node in the IAB network, the node comprising:
   a memory comprising instruction data representing a set of instructions; and
   processing circuitry configured to communicate with the memory and to execute the set of instructions, the processing circuitry being operable configured to:
      for each candidate route, determine a predicted transmission delay associated with sending the data along the respective candidate route based on channel measurements between nodes along the respective candidate route and an error probability constraint for the data, the transmission delay being predicted for a transmission of the data that satisfies the error probability constraint in view of the channel measurements; and
      select a preferred route from the plurality of candidate routes for sending the data based on the predicted transmission delays, the selecting of the preferred route from the plurality of candidate routes comprises selecting the route with a smallest predicted transmission delay.

11. The node of claim 10, wherein the channel measurements comprise one or more of gain measurements and signal to noise measurements performed by nodes along the respective candidate route.

12. The node of claim 10, wherein the processing circuitry being configured to determine a predicted transmission delay for each candidate route comprises the processing circuitry being configured to:
   based on the channel measurements for a respective candidate route, determine one or more of a decoding and a buffering scheme for the respective candidate route that results in the transmission satisfying the error probability constraint; and
   determine the predicted transmission delay for the respective candidate route based on the one or more of the decoding and the buffering scheme.

13. The node of claim 12, wherein the processing circuitry being configured to determine one or more of the decoding and the buffering scheme for the respective candidate route comprises the processing circuitry being configured to determine a codeword length for the transmission that satisfies the error probability constraint.

14. The node of claim 13, wherein each candidate route comprises a plurality of links between nodes along the respective candidate route, and the processing circuitry being operable to determine a codeword length for a respective candidate route comprises the processing circuitry being configured to determine a respective codeword length for the transmission between each of the links in the candidate route.

15. The node of claim 10, wherein the predicted transmission delay for each candidate route is further determined based on one or more of:
   a predicted decoding delay for each respective candidate route
   a probability of a decoding error for the respective candidate route; and
   one or more scheduling delays for the intermediate nodes along the respective candidate route.

16. The node of claim 10, wherein the processing circuitry is further configured to initiate sending the data from the first node to the second node along the preferred route.

17. The node of claim 10, wherein one of the first node and the second node is a wireless device and the other of the first node and the second node is an IAB donor.

18. The node of claim 10, wherein the node is an IAB donor in the IAB network.

* * * * *